Aug. 30, 1966   J. J. KURTZ ET AL   3,269,000
METHOD AND APPARATUS FOR MAKING END WELDABLE STUDS
Filed Sept. 17, 1964   2 Sheets-Sheet 2

INVENTORS:
JOSEPH J. KURTZ.
DALE A. WEBSTER.
BY JOHN J. KURUCZ.

Owen + Owen
ATT'YS.

United States Patent Office 3,269,000
Patented August 30, 1966

3,269,000
METHOD AND APPARATUS FOR MAKING END WELDABLE STUDS
Joseph J. Kurtz, Lorain, Dale A. Webster, Elyria, and John J. Kurucz, Lorain, Ohio, assignors to Gregory Industries, Inc., Lorain, Ohio, a corporation of Michigan
Filed Sept. 17, 1964, Ser. No. 397,259
25 Claims. (Cl. 29—430)

This invention relates to a method and apparatus for making end weldable studs and particularly for making studs having an insert of solid flux at the weldable end.

Solid flux studs of the type shown in Nelson Patent 2,612,394, for example, are continually finding greater use in the art. Heretofore, the production of such studs has required several operations, with the general shape of the stud being formed from bar stock, the end of the stud then being machined, and, finally, the solid flux being applied to the weldable end of the stud. These operations were performed on different machines at different locations and required considerable time, labor, and capital outlay.

The present invention relates to a method and apparatus for producing studs more rapidly, with fewer operations, less apparatus, and at less expense. In accordance with the invention, the weldable end of the stud is shaped and the slug or insert of flux is added as the stud is formed in a progressive-die machine or cold header, rather than by shaping the weldable end and adding the flux as additional, separate operations on separate machines. Also in accordance with the invention, the slug of flux is affixed to the weldable end of the stud more securely than heretofore.

It is, therefore, a principal object of the invention to provide an improved method and apparatus for making solid flux studs more rapidly, with fewer operations, and at lower cost.

Another object of the invention is to provide an improved method and apparatus for loading and shaping slugs of flux in an end of a stud.

Other objects and advantages of the invention will be apparent from the following detailed description of a preferred embodiment thereof, reference being made to the accompanying drawings, in which.

Figure 1:
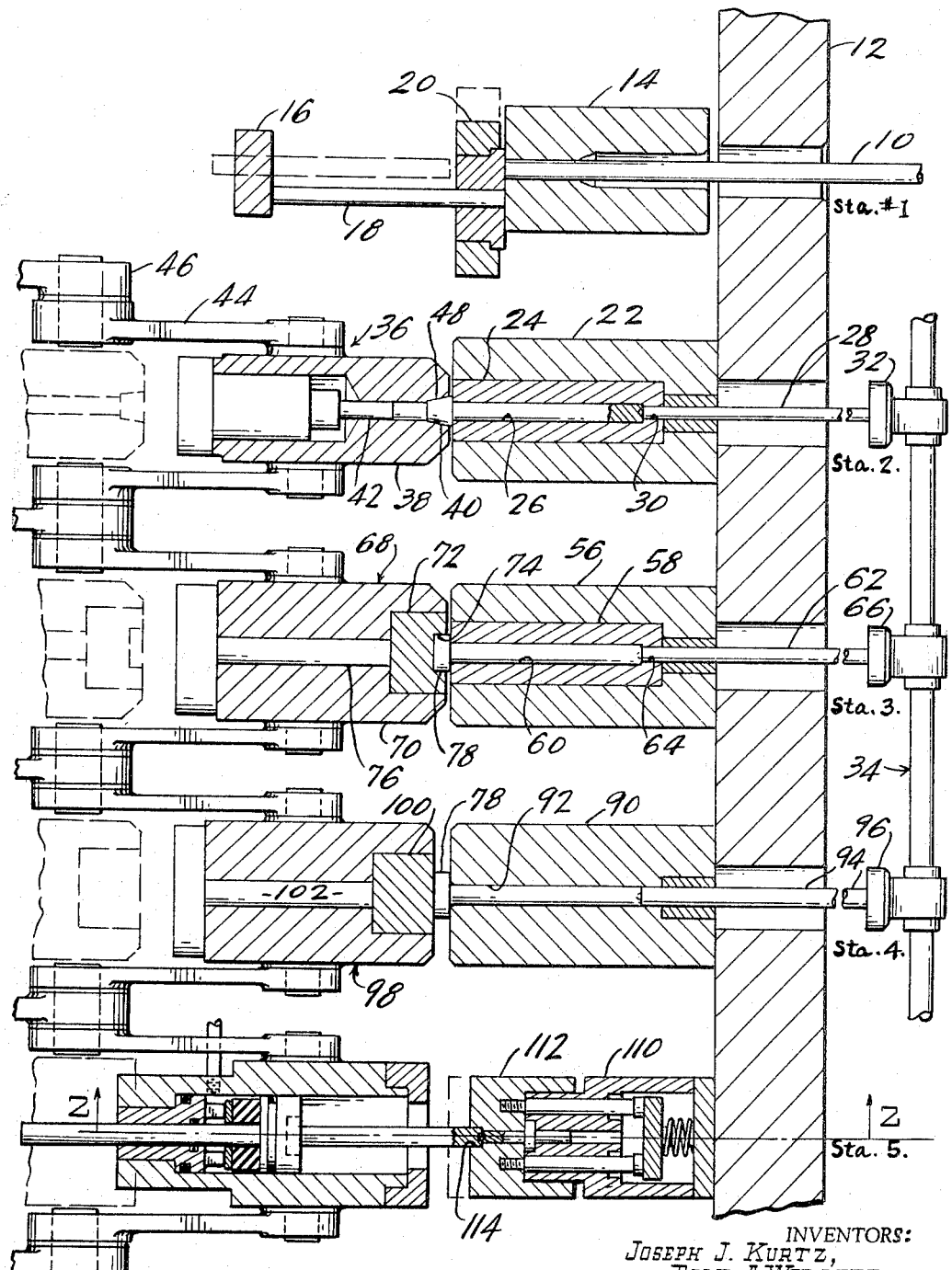
FIG. 1 is a somewhat schematic view in horizontal cross section of five stations of a progressive-die machine for making end weldable studs according to the invention.

Referring to the drawings, and more particularly to FIG. 1, five stations of a cold heading machine are shown, somewhat schematically. Bar stock 10 is fed to a first, cutting station from a suitable source of supply through an opening in a bolster plate 12, through a guide block 14, and against a stop member 16. A piece 18 of stock of predetermined length is then severed by a cutter 20 which moves transversely to the longitudinal extent of the piece 18 and shears it with respect to the guide block 14.

From the first station, the stock piece 18 is transferred to a second station which includes a die body or holder 22 suitably affixed to the bolster plate 12 and supporting a first die 24 having a first die recess 26 therein. A first ejector or forming pin 28 is aligned with the die recess 26 and extends through an end opening 30 concentric with the recess 26. The ejector pin 28 has a driving head 32 which is driven by a cam and drive shaft arrangement generally indicated at 34, or by any other suitable means operating in timed relation to the heading and forming mechanisms hereinafter described. The specific means for operating the ejector pin 28 does not constitute part of the invention and the cam assembly is shown for purposes of illustration. Aligned with the die recess 26 is a first hammer or plunger assembly 36 which includes a heading die 38 having a heading recess 40, and a punch 42. The hammer 36 is moved in a straight line toward and away from the die 24 between a forward position shown in solid lines and a retracted position shown in dotted lines. This movement can be accomplished by any suitable crank or cam mechanism that will impart the necessary periodic strokes to the plungers through connecting links 44 and 46.

The hammer 36 is held in the retracted position while the stock piece 18 is moved between it and the die 24 and brought into alignment with the die recess 26 and the heading recess 40. The hammer is then moved forwardly with one end of the stock piece 18 entering the heading recess 40 until stopped by the punch 42, with the other end entering the die 24 until stopped by the end of the recess 26. After this point, the hammer 36 continues to move toward the die 24 and causes a tapered enlargement 48 to be formed on the stock 18 by the die member 38. At the same time, the opposite or flux end of the stock piece 18 is rounded by a rounded end portion 50 of the die recess 26.

After the hammer reaches the forward position shown in solid lines, the ejector pin 28 is moved forwardly through the opening 30 to strike the rounded end of the stock piece 18. This ejector pin is provided with a small pin extension 52 to form an initial recess 54 in the rounded end of the stock piece 18. The hammer 36 is then moved to the retracted position with the pin 28 moving forwardly to eject the partially formed stock piece 18 from the recess 26. Hence, in the second station, the enlargement 48 is formed on the piece 18, the initially rounded end is formed thereon, and the initial recess 54 is also produced.

The partially formed stock piece 18 is then transferred to a third station where the formation of the stud head and the shaping of the weldable end are completed. The third station includes a second die body 56 affixed to the bolster plate 12 and having a second forming die 58, a die recess of which is designated 60. A second ejector and forming pin 62 extends through an end opening 64 in the die 58 and also has a driving head 66. A second hammer or plunger assembly 68 is located at the third station and includes a head die 70 having an insert 72 forming a heading die recess 74. The hammer 68 also includes a punch 76 backing up the insert 72. The second hammer 68 also is moved between a retracted position shown in dotted lines and the forward position shown in solid lines, always being in alignment with the die recess 60.

Figure 4:
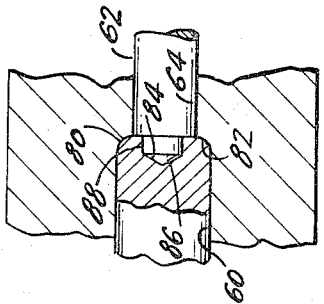
Figure 3:
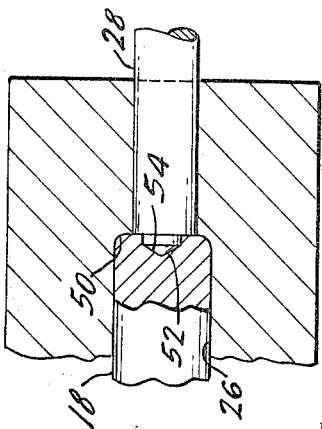

When the partially finished stock piece 18 is moved between the die 58 and the hammer 68, it is pushed into the die recess 60 until the weldable or flux end bottoms on the end of the recess 60, with the head end of the piece in the closing path of the heading die 74. A completed stud head 78 then is formed on the piece 18 with the closing movement of the plunger assembly 68. The weldable or flux end of the piece 18 is simultaneously further rounded to produce a final rounded end 80 by virtue of a further rounded end portion 82 at the bottom of the die recess 60. A flux recess 84 is also formed to final depth in the end of the piece by a tapered end portion of the ejector pin 62 constituting a conical tip 86 (FIG. 4) and an adjacent cylindrical projection 88. The flux recess can be completed as the stud piece is forced into the die recess 60 by the hammer 68, with the conical portion 86 and the cylindrical portion 88 extending into the end of the die recess.

The stock piece 18 with the now-completed head 78 and the fully rounded end 80 is then transferred to a fourth forming station where a crimping operation is performed on the flux end of the stud. The fourth station includes a die member 90 having a central longitudinal passage 92 instead of a die recess. An ejector and forming pin 94 extends into the passage 92 and has a driving head 96 similar to those previously discussed. A third hammer or plunger assembly 98, in this instance, simply includes a flat back-up insert 100 and a punch 102. The insert 100 engages the stud head 78 and forces the piece into the passage 92 but does not further form the head 78.

Figure 5:
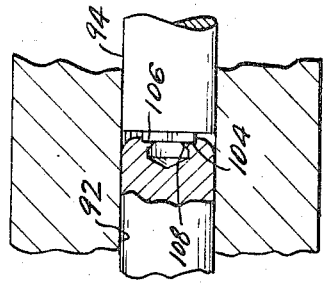
FIGS. 3–5 are further enlarged sectional views of parts of die recesses and ejector pins of the second, third, and fourth stations of the apparatus shown in FIG. 1.

As shown best in FIG. 5, the pin 94 is of the same diameter as the passage 92 and has an elongate crimping projection 104, the dimension across which exceeds the existing diameter of the recess 84. When the crimping projection 104 engages the end of the stock piece 18, it produces a pair of diametrically opposed small recesses 106 in the end of the stud piece and, at the same time, strikes radially inwardly extending projections 108 on the adjacent end of the stock piece. The projections 108 are important because they subsequently retain the flux slug in the recess very securely. Otherwise, the slugs have been found to have a tendency to fall out of the recess. This apparently results because the walls of the recess 84 are relatively smooth due to the way in which they are formed, and also because they have a slight taper, which represents the draft necessary for withdrawal of the forming end of the pins.

The stud at this time is completed except for the loading of the flux, which is performed at the fifth station. This station includes a die support 110 affixed to the bolster plate 12 and yieldably holding a die member 112 having a relatively shallow die recess 114. The die member 112 also has a guide recess 116 (FIG. 2) cooperating with a guide projection 118 of the die body support 110. Four guide pins 120 are affixed to the die member 112 and extend through guide passages 122 in the die support 110 to terminate in heads 124. The four guide pins 120 are engaged by a spring pressed plate 126 which is urged outwardly by a spring 128, the outward movement being limited by the guide pin heads 124.

Figure 2:
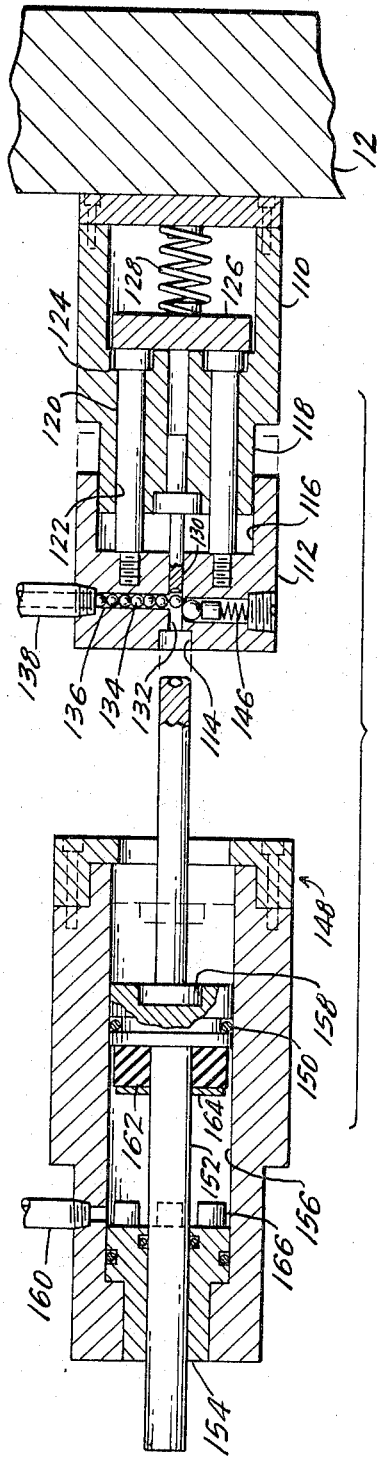
FIG. 2 is an enlarged view in vertical cross section, taken along the line 2—2 of FIG. 1, of the fifth station of the apparatus, with the parts being in a different position.
Figure 6:
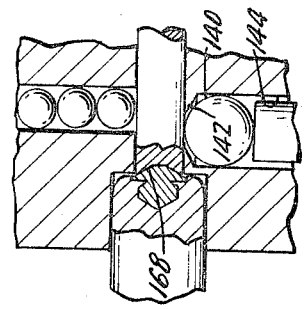
FIG. 6 is an enlarged sectional view of a die recess, a forming punch, and slug feeding means of the apparatus shown in FIG. 2.

A supply and flux slug forming punch 130 is suitably retained in the die holder 110 and projects longitudinally into a slug feed passage 132 located co-axially with the shallow recess 114. The feed passage 132 is just slightly larger than flux slugs 134 which are fed sequentially to the feed passage 132 from a supply passage 136 communicating with a supply line 138 or a hopper. When the flux slugs are fed to the feed passage 132, they are restricted from moving in one direction by the punch 130 and in the opposite direction by a spring-loaded detent ball 140 (FIG. 6). The ball 140 projects slightly into the feed passage 132 through a restricted opening 142 at the end of a detent passage 144, being urged in this direction by a suitable coil spring 146 (FIG. 2).

A ram assembly 148 for bringing the stud into position to be loaded with flux includes an air-operated piston 150 carrying a piston rod 152 extending rearwardly through an end member 154 forming part of an air cylinder 156, although a spring could be substituted. The piston 150 has a stud holding recess 158 to receive and engage the head 78 of the stud and to move the stud into the shallow recess 114 of the die member 112. When the ram 148 moves forwardly, the piston 150 moves rearwardly against the pressure of air in the cylinder 156 supplied through a line 160. At the end, a rubber bumper 162 and a metal washer 164 on the rear of the piston 150 will engage a spacer 166 adjacent the end member 154 and provide the final force on the stud. In the event that one of the studs is slightly longer than usual, the rubber will yield to prevent excess force on and deformation of the stud.

The pressure in the air cylinder 156 is sufficient to overcome the force of the spring 128 so that as the ram 148 moves toward the die member 112, it will compress the spring and move the member 112 rearwardly until the pressure of the air is overcome. As the die member 112 moves rearwardly, the punch 130 remains stationary so that it moves the flux slug 134 through the feed passage 132, past the detent ball 140, and toward the stud recess 84. The slug 132 is finally forced into the recess 84 and shaped to a slightly truncated conical configuration by a shallow truncated conical forming hole or recess 168 in the end of the punch 130. The cooperation of the bumper 162 and the spacer 166 in the cylinder 156 is sufficient to back up the stud during this inserting and forming operation. The flux slug is preferably of a diameter slightly larger than the diameter of the recess 84 so as to completely fill the recess and also to extend outwardly slightly as shown in FIG. 6 as a result of the configuration of the forming hole 168.

When the ram assembly 148 backs away, the spring 128 moves the die member 112 outwardly, with the punch 130 then retracting relative to the passage 132. As the punch 130 moves past the detent ball 140, the ball again projects into the feed passage 132, and after the punch moves to the rear of the supply passage 136, another of the flux slugs 134 is fed downwardly into the feed passage, ready for another operation.

The final slug loading operation completes the stud which is formed in the five station header without any extra time or additional machines being required.

Various modifications of the above described embodiment of the invention will be apparent to those skilled in the art, and it is to be understood that such modifications can be made without departing from the scope of the invention, if they are within the spirit and the tenor of the accompanying claims.

We claim:

1. A method of making an end weldable stud having an enlarged head on one end and a body of flux inserted at the other end, said method comprising feeding bar stock longitudinally to a cutting station, severing a piece of bar stock to a predetermined length, transferring the severed piece to a first forming station, rounding the edge of the flux end of the piece and simultaneously forming an initial enlargement of the head end thereof, forming an initial stud recess centrally located in the flux end, transferring the piece to a second forming station, completing rounding the edge of the flux end of the piece, and simultaneously causing final enlargement of the enlarged end thereof to form the head on the piece, finally forming and shaping the recess in the flux end of the stud, transferring the piece to a third forming station, crimping the flux end of the stud adjacent the stud recess to force inwardly portions of the edges of the stud recess, transferring the piece to a flux-loading station, centering a flux ball with the stud recess, and forcing the ball into the stud recess and simultaneously shaping it to a generally conical configuration.

2. A method of making an end weldable stud having an enlarged head on one end and a body of flux inserted at the other end, said method comprising rounding the edge of the flux end of a stud piece at a first forming station and simultaneously forming an initial enlargement of the head end thereof, forming an initial stud recess centrally located in the flux end, completing rounding the edge of the rounded end of the piece at a second forming station and simultaneously causing final enlargement of the enlarged end thereof to form the head on the piece, finally forming and shaping the stud recess in the flux end of the stud, crimping the finally rounded end of the stud adjacent the stud recess at a third forming station to force inwardly portions of the edges of the stud recess, centering a slug of flux with the stud recess at a flux-loading station, and forcing the slug into the stud recess and simultaneously shaping it to a generally conical shape.

3. A method of making an end weldable stud having an enlarged head on one end and a body of flux inserted at the other end, said method comprising rounding the edge of the flux end of a stud piece at a first forming station and simultaneously forming an initial enlargement of the head end thereof, forming an initial stud recess centrally located in the flux end, completing rounding the edge of the rounded end of the piece at a second forming station and simultaneously causing final enlargement of the enlarged end thereof to form the head on the piece, finally forming and shaping the stud recess in the flux end of the stud, centering a slug of flux with the stud recess at a flux-loading station, and forcing the slug into the stud recess and simultaneously shaping it to a generally conical shape.

4. A method of making an end weldable stud having flux at an end, said method comprising rounding the edge of the flux end of a stud piece at a first forming station, forming an initial stud recess centrally located in the rounded end, completing rounding the edge of the rounded end of the piece at a second forming station, forming and shaping the stud recess in the flux end of the stud, crimping the finally rounded end of the stud adjacent the stud recess at a third forming station to force inwardly portions of the edges of the stud recess, centering a slug of flux with the stud recess at a flux-loading station, and forcing the slug into the stud recess and simultaneously shaping it to a generally conical shape.

5. A method of making an end weldable stud having flux at an end, said method comprising rounding the edge of the flux end of a stud piece at a first forming station, forming an initial stud recess centrally located in the rounded end, completing rounding the edge of the rounded end of the piece at a second forming station, finally forming and shaping the stud recess in the flux end of the stud, centering a slug of flux with the stud recess at a flux-loading station, and forcing the slug into the stud recess and simultaneously shaping it to a generally conical shape.

6. A method of making an end weldable stud having an enlarged head on one end and flux at the other end, said method comprising cutting a piece of metal stock of predetermined length, applying pressure to one end of said piece to round the edge of the other end by forcing the piece into a first die recess having a rounded end, and simultaneously enlarging the first end thereof, forming an initial stud recess centrally located in the rounded end, ejecting the piece from said first die recess, applying pressure to the enlarged end of the piece to complete rounding the edge of the rounded end by forcing the piece into a second die recess having an additionally rounded end, and simultaneously finally enlarging the enlarged end thereof to form the head on the piece, finally forming and shaping the stud recess, ejecting the piece from the second die recess, moving the recessed end of the piece into a third die recess, crimping the recessed end of the piece adjacent the stud recess to force inwardly portions of the edges of the stud recess, ejecting the piece from the third die recess, centering a slug of flux with the stud recess, and forcing the slug into the stud recess and simultaneously shaping it to a predetermined shape.

7. A method of making an end weldable stud having an enlarged head on one end and flux at the other end, said method comprising cutting a piece of metal stock of predetermined length, applying pressure to one end of said piece to round the edge of the other end by forcing the piece into a first die recess having a rounded end, and simultaneously enlarging the first end thereof, forming an initial stud recess centrally located in the rounded end, ejecting the piece from said first die recess, applying pressure to the enlarged end of the piece to complete rounding the edge of the rounded end by forcing the piece into a second die recess having an additionally rounded end, and simultaneously finally enlarging the enlarged end thereof to form the head on the piece, finally forming and shaping the stud recess, ejecting the piece from the second die recess, centering a slug of flux with the stud recess, and forcing the slug into the stud recess and simultaneously shaping it to a predetermined shape.

8. A method of making an end weldable stud having an enlarged head on one end and flux at the other end, said method comprising cutting a piece of metal stock of predetermined length, applying pressure to one end of said piece to round the edge of the other end by forcing the piece into a die recess having a rounded end, and simultaneously enlarging the first end thereof, forming a stud recess centrally located in the rounded end, ejecting the piece from said die recess, moving the recessed end of the piece into another die recess, crimping the recessed end of the piece adjacent the stud recess to force inwardly portions of the edges of the stud recess, ejecting the piece from said another die recess, centering a slug of flux with the stud recess, and forcing the slug into the stud recess and simultaneously shaping it to a predetermined shape.

9. A method of making an end weldable stud having an enlarged head on one end and flux at the other end, said method comprising cutting a piece of metal stock of predetermined length, applying pressure to one end of said piece to round the edge of the other end by forcing the piece into a die recess having a rounded end, and simultaneously enlarging the first end thereof, forming a stud recess centrally located in the rounded end, ejecting the piece from said die recess, centering a slug of flux with the stud recess, and forcing the slug into the stud recess and simultaneously shaping it to a predetermined shape.

10. A method of making an end weldable stud having flux at one end, said method comprising cutting a piece of metal stock of predetermined length, applying pressure to the other end of said piece to round the edge of the one end by forcing the piece into a first die recess having a rounded end, forming an initial stud recess located centrally in the rounded end, ejecting the piece from said first die recess, applying pressure to the one end of said piece to complete rounding the edge of the rounded end by forcing the piece into a second die recess having an additionally rounded end, finally forming and shaping the stud recess, ejecting the piece from the second die recess, moving the rounded end of the piece into a third die recess, crimping the recessed end of the piece adjacent the stud recess to force inwardly portions of the edges of the stud recess, ejecting the piece from the third die recess, centering a slug of flux with the stud recess, and forcing the slug into the stud recess and simultaneously shaping it to a predetermined shape.

11. A method of making an end weldable stud having flux at one end thereof, said method comprising cutting a piece of metal stock of predetermined length, applying pressure to the other end of said piece to round the edges of the one end by forcing the piece into a die recess having a rounded end, forming a stud recess centrally located in the rounded end, ejecting the piece from the die recess, moving the recessed end of the piece into another die recess, crimping the recessed end of the piece adjacent the stud recess to force inwardly portions of the edges of the stud recess, ejecting the piece from said another die recess, centering a slug of flux with the stud recess, and forcing the slug into the stud recess and simultaneously shaping it to a predetermined shape.

12. A method of making an end weldable stud having flux at one end thereof, said method comprising cutting a piece of metal stock of predetermined length, applying pressure to the other end of said piece to round the edges of the one end by forcing the piece into a die recess having a rounded end, forming a stud recess centrally located in the rounded end, ejecting the piece from the die recess, centering a slug of flux with the stud recess, and forcing the slug into the stud recess and simultaneously shaping it to a predetermined shape.

13. A method of making an end weldable stud having an enlarged head on one end and flux at the other end, said method comprising cutting a piece of metal stock of predetermined length, initially enlarging the one end of said piece, simultaneously rounding the other end of said piece and forming a stud recess in the rounded end, finally enlarging the one end of said piece, simultaneously further rounding the other end of said piece and completing and shaping the recess in the rounded end, crimping the recessed end of the piece adjacent the stud recess to force inwardly portions of the edges of the stud recess, centering a slug of flux with the stud recess, forcing the slug into the stud recess, and simultaneously shaping the slug to a predetermined shape.

14. A method of making an end weldable stud having flux at one end, said method comprising cutting a piece of metal stock of predetermined length, rounding the one end of said piece and forming a stud recess in the rounded end, further rounding the one end of said piece and completing and shaping the recess in the rounded end, crimping the recessed end of the piece adjacent the stud recess to force inwardly portions of the edges of the stud recess, centering a slug of flux with the stud recess, and forcing the slug into the stud recess, and simultaneously shaping the slug to a predetermined shape.

15. A method of making an end weldable stud having flux at one end, said method comprising cutting a piece of metal stock of predetermined length, rounding the one end of said piece and forming a stud recess in the rounded end, further rounding the one end of said piece and completing and shaping the recess in the rounded end, centering a slug of flux with the stud recess, and forcing the slug into the stud recess, and simultaneously shaping the slug to a predetermined shape.

16. Apparatus for forming a slug-loaded stud having an enlarged head on one end and a slug of flux located in a recess at the other end, said apparatus comprising means for cutting off pieces of bar stock of predetermined length, a first forming station including means forming a first die recess having a rounded end portion and hammer means for forcing each of the pieces into said first die recess to cause the annular edge at the other end thereof to be slightly rounded and to form an enlargement at the one end, a knock-out pin having a tapered end to partially form a stud recess in an end of the piece, means for moving said knock-out pin longitudinally into said die recess centrally thereof to eject the piece from said die recess, a second forming station including means forming a second die recess having an additionally rounded end portion and second hammer means for forcing the piece into said second recess to complete the rounding of the rounded annular edge thereof and to further enlarge and to shape the head on the other end of the piece, a second knockout pin having a tapered end to complete the formation of the stud recess, means for moving said second knockout pin into said second die recess to eject the piece from the second die recess, a third forming station comprising means forming a third die recess and means for moving the piece into the third die recess, a third knock-out pin having a blunt end with an elongated transverse cross section to engage the end of the piece adjacent said stud recess to crimp inwardly diametrically opposite edge portions thereof, means for moving said third knock-out pin into said third die recess to eject the piece from said third die recess, a slug-loading station including a die member forming a shallow recess and a passage communicating centrally therewith, supporting means for yieldably supporting said die member for movement in a direction parallel to said passage, a forming punch extending into said passage and fixedly held by said supporting means, said die member having a supply passage communicating with and locating transversely of said central passage, means for sequentially feeding slugs of flux through said supply passage to said central passage, yieldable detent means for temporarily retaining said flux slugs in said central passage, means for pushing said piece against said die member to move said die member against said supporting means, thereby causing said punch to move the flux slug into the stud recess and to form the exposed portion into a generally conical shape, and bolster means for supporting said first, second, and third die recess-forming means and said die member supporting means and for maintaining them in fixed positions relative to one another.

17. Apparatus for forming a slug-loaded stud having an enlarged head on one end and a slug of flux located in a recess at the other end, said apparatus comprising means for cutting off pieces of bar stock of predetermined length, a first forming station including means forming a first die recess having a rounded end portion and hammer means for forcing each of the pieces into said first die recess to cause the annular edge at the other end thereof to be slightly rounded and to form an enlargement at the one end, a knock-out pin having a tapered end to partially form a stud recess in an end of the piece, means for moving said knock-out pin longitudinally into said die recess centrally thereof to eject the piece from said die recess, a second forming station including means forming a second die recess having an additionally rounded end portion and second hammer means for forcing the piece into said second recess to complete the rounding of the rounded annular edge thereof and to further enlarge and to shape the head on the other end of the piece, a second knock-out pin having a tapered end to complete the formation of the stud recess, means for moving said second knock-out pin into said second die recess to eject the piece from the second die recess, a slug-loading station including a die member forming a shallow recess and a passage communicating centrally therewith, supporting means for yieldably supporting said die member for movement in a direction parallel to said passage, a forming punch extending into said passage and fixedly held by said supporting means, said die member having a supply passage communicating with and locating transversely of said central passage, means for sequentially feeding slugs of flux through said supply passage to said central passage, means for temporarily retaining said flux slugs in said central passage, means for pushing said piece against said die member to move said die member against said supporting means, thereby causing said punch to move the flux slug into the stud recess and to form the exposed portion into a generally conical shape, and supporting means for supporting said first and second die recess forming means and said die member supporting means and for maintaining them in fixed positions relative to one another.

18. Apparatus for forming a slug-loaded stud having a slug of flux located in a recess at one end, said apparatus comprising means for cutting off pieces of bar stock of predetermined length, a first forming station including means forming a first die recess having a rounded end portion and means for forcing each of the pieces into said first die recess to cause the annular edge at the one end thereof to be slightly rounded, a knock-out pin having a tapered end to partially form a stud recess in the one end of the piece, means for moving said knock-out pin longitudinally into said die recess centrally thereof to eject the piece from said die recess, a second forming station including means forming a second die recess having an additionally rounded end portion and second means for forcing the piece into said second recess to complete the rounding of the rounded annular edge thereof, a second knock-out pin having a tapered end to complete the formation of the stud recess, means for moving said second knock-out pin into said second die recess to eject the piece from the second die recess, a third forming station comprising means forming a third die recess and means for moving the piece into the third die recess, a third knock-out pin having a blunt end with an elongated transverse cross section to engage the end of the piece adjacent said stud recess to crimp inwardly the diametrically opposite edge portions thereof, means for moving said third knock-out pin into said third die recess to eject the piece from said third die recess, a slug-loading station including a die member forming a shallow recess and a passage communicating centrally therewith, a forming punch extending into said passage, said die member having a supply passage communicating with and locating transversely of said central passage, means for sequentially feeding slugs of flux through said supply passage to said central passage, means for temporarily retaining said flux slugs in said central passage, means for causing said punch to move the flux slug into the stud recess and to form the exposed portion into a generally conical shape, and supporting means for supporting said first, second, and third die recess forming means and said die member and for maintaining them in predetermined positions relative to one another.

19. Apparatus for forming a slug-loaded stud having a slug of flux located in a recess at one end, said apparatus comprising means for cutting off pieces of bar stock of predetermined length, a first forming station including means forming a first die recess having a rounded end portion and means for forcing each of the pieces into said first die recess to cause the annular edge at the one end thereof to be slightly rounded, a knock-out pin having a tapered end to partially form a stud recess in the one end of the piece, means for moving said knock-out pin longitudinally into said die recess centrally thereof to eject the piece from said die recess, a second forming station including means forming a second die recess having an additionally rounded end portion and second means for forcing the piece into said second recess to complete the rounding of the rounded annular edge thereof, a second knock-out pin having a tapered end to complete the formation of the stud recess, means for moving said second knock-out pin into said second die recess to eject the piece from the second die recess, a slug-loading station including a die member forming a shallow recess and a passage communicating centrally therewith, a forming punch extending into said passage, said die member having a supply passage communicating with and locating transversely of said central passage, means for sequentially feeding slugs of flux through said supply passage to said central passage, means for temporarily retaining said flux slugs in said central passage, means for causing said punch to move the flux slug into the stud recess and to form the exposed portion into a generally conical shape, and supporting means for supporting said first and second die recess forming means and said die member and for maintaining them in predetermined positions.

20. Apparatus for forming a slug-loaded stud having a slug of flux located in a recess at one end, said apparatus comprising a forming station including means forming a die recess having a rounded end portion and means for forcing a piece of stock of predetermined length into said die recess to cause the annular edge at one end thereof to be rounded, a knock-out pin having a tapered end to form a stud recess in an end of the piece, means for moving said knock-out pin longitudinally into said die recess centrally thereof to eject the piece from said die recess, another forming station comprising means forming another die recess and means for moving the piece into said another die recess, another pin having a blunt end with an elongated transverse cross section to engage the end of the piece adjacent said stud recess to crimp inwardly diametrically opposite edge portions thereof, means for moving said another pin into said another die recess to eject the piece from said another die recess, a slug-loading station including a die member forming a shallow recess and a passage communicating centrally therewith, a forming punch extending into said passage, said die member having a supply passage communicating with and locating transversely of said central passage, means for sequentially feeding slugs of flux through said supply passage to said central passage, means for temporarily retaining said flux slugs in said central passage, means for causing said punch to move the flux slug into the stud recess and to form a projecting portion into a predetermined shape, and supporting means for supporting said die recess forming means, said another die recess forming means, and said die member in predetermined positions.

21. Apparatus for forming a slug-loaded stud having a slug of flux located in a recess at one end, said apparatus comprising a forming station including means forming a die recess having a rounded end portion and means for forcing a piece of stock of predetermined length into said die recess to cause the annular edge at one end thereof to be rounded, a knock-out pin having a tapered end to form a stud recess in an end of the piece, means for moving said knock-out pin longitudinally into said die recess centrally thereof to eject the piece from said die recess, a slug-loading station including a die member forming a shallow recess and a passage communicating centrally therewith, a forming punch extending into said passage, said die member having a supply passage communicating with and located transversely of said central passage, means for sequentially feeding slugs of flux through said supply passage to said central passage, means for temporarily retaining said flux slugs in said central passage, means for causing said punch to move the flux slug into the stud recess and to form a projecting portion into a predetermined shape, and supporting means for supporting said die recess forming means and said die member in predetermined positions relative to one another.

22. Apparatus for forming a slug-loaded stud having a slug of flux located in a recess at one end, said apparatus comprising a forming station including means forming a die recess having a rounded end portion and means for forcing a piece of stock of predetermined length into said die recess to cause the annular edge at one end thereof to be rounded, a knock-out pin having a tapered end to form a stud recess in an end of the piece, means for moving said knock-out pin longitudinally into said die recess centrally thereof to eject the piece from said die recess, a slug-loading station including a die member forming a recess for receiving the rounded end of the stud and a passage communicating centrally therewith, means for moving a slug of flux through said passage and into the stud recess and to form a projecting portion into a predetermined shape, and supporting means for supporting said die recess forming means and said die member in predetermined positions relative to one another.

23. Apparatus for loading and forming a body of flux in a recess in an end of a welding stud, said apparatus comprising a die member forming a shallow recess to receive the end of the stud, a passage communicating centrally with the recess, and a supply passage communicating with and located transversely of said central passage, means for sequentially feeding bodies of flux through said supply passage to said central passage, detent means for temporarily retaining one of the flux bodies at a time in said central passage, a forming punch extending into said central passage and having a recessed end of generally conical shape, and means causing relative movement between said punch and said central passage to move said punch from a rear position behind said supply passage to a forward position to force the body of flux against the end of the stud to move the flux body into the stud recess and to form a projecting portion of the body into a predetermined, generally conical shape.

24. Apparatus for loading and forming a body of flux in a recess in an end of a welding stud, said apparatus comprising a die member forming a recess to receive the end of the stud, a passage communicating centrally with the recess, and a supply passage communicating with said central passage, means for feeding one body of flux at a time to said central passage from said supply passage, a forming punch extending into said central passage and having a shaped end, and means causing said punch to force the body of flux into the stud recess and to form a projecting portion of the body into a predetermined shape.

25. Apparatus for loading and forming a body of flux in a recess in an end of a welding stud, said apparatus comprising a die member having means to receive the end of the stud and a passage communicating centrally with the stud-receiving means, means for feeding bodies of flux one at a time to said central passage, a forming punch extending into said passage, and means for causing relative movement between said punch and said die member to move the flux body at least partly into the stud recess.

References Cited by the Examiner

UNITED STATES PATENTS

| | | | |
|---|---|---|---|
| 1,805,124 | 5/1931 | Wilcox | 29—34 |
| 2,056,559 | 10/1936 | Berliner | 29—211 |
| 2,332,445 | 10/1943 | Grim | 29—208 |
| 2,612,394 | 9/1952 | Nelson | 287—20.2 |
| 2,652,733 | 9/1953 | Gilda | 29—200 |
| 2,942,391 | 6/1960 | Aversten | 53—30 |
| 3,112,562 | 12/1963 | Wilson | 29—430 |
| 3,126,561 | 3/1964 | Orloff | 10—27 X |

JOHN F. CAMPBELL, *Primary Examiner.*

THOMAS H. EAGER, *Examiner.*